United States Patent

Thrasher et al.

(10) Patent No.: US 9,360,986 B2
(45) Date of Patent: Jun. 7, 2016

(54) MODE-SWITCHING IN ULTRA MOBILE DEVICES

(75) Inventors: James J. Thrasher, Efland, NC (US);
Justin T. Dubs, Durham, NC (US);
Steven R. Perrin, Raleigh, NC (US);
James S. Rutledge, Durham, NC (US);
Michael T. Vanover, Raleigh, NC (US);
Jennifer G. Zawacki, Hillsborough, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 1777 days.

(21) Appl. No.: 11/831,933

(22) Filed: Jul. 31, 2007

(65) Prior Publication Data

US 2009/0037825 A1 Feb. 5, 2009

(51) Int. Cl.
*G06F 3/0481* (2013.01)
*G06F 1/32* (2006.01)

(52) U.S. Cl.
CPC ............ *G06F 3/0481* (2013.01); *G06F 1/3203* (2013.01); *G06F 1/3265* (2013.01); *Y02B 60/1242* (2013.01)

(58) Field of Classification Search
USPC .................................. 715/748, 864; 345/173
See application file for complete search history.

(56) References Cited

U.S. PATENT DOCUMENTS

| | | | | |
|---|---|---|---|---|
| 5,944,829 A * | 8/1999 | Shimoda | ......................... | 713/324 |
| 6,073,031 A * | 6/2000 | Helstab et al. | ................ | 455/557 |
| 6,297,795 B1 * | 10/2001 | Kato et al. | ..................... | 345/684 |
| 6,429,625 B1 * | 8/2002 | LeFevre et al. | ................ | 320/155 |
| 6,697,032 B2 * | 2/2004 | Chitturi et al. | ................ | 345/168 |
| 7,013,163 B2 * | 3/2006 | Jaggers et al. | ................ | 455/557 |
| 7,076,270 B2 * | 7/2006 | Jaggers et al. | .............. | 455/556.1 |
| 7,426,697 B2 * | 9/2008 | Holecek et al. | ................ | 715/788 |
| 7,616,197 B1 * | 11/2009 | Gettemy et al. | ............... | 345/211 |
| 2002/0184610 A1 * | 12/2002 | Chong et al. | ................... | 717/109 |
| 2003/0197679 A1 * | 10/2003 | Ali et al. | ......................... | 345/158 |
| 2004/0263491 A1 * | 12/2004 | Ishigaki | ......................... | 345/177 |
| 2005/0140660 A1 * | 6/2005 | Valikangas | ..................... | 345/173 |
| 2005/0149879 A1 * | 7/2005 | Jobs et al. | ....................... | 715/796 |
| 2006/0197753 A1 * | 9/2006 | Hotelling | ........................ | 345/173 |
| 2006/0227122 A1 * | 10/2006 | Proctor | ............................ | 345/204 |
| 2007/0006092 A1 * | 1/2007 | Makela | ............................ | 715/773 |
| 2007/0226647 A1 * | 9/2007 | Louch | ............................ | 715/788 |

FOREIGN PATENT DOCUMENTS

| | | |
|---|---|---|
| CN | 2641944 Y | 9/2004 |
| CN | 1941066 A | 4/2007 |
| TW | M285745 U | 1/2006 |
| WO | 0026803 A1 | 5/2000 |

* cited by examiner

*Primary Examiner* — Phenuel Salomon
(74) *Attorney, Agent, or Firm* — Ference & Associates LLC

(57) ABSTRACT

Arrangements for managing displays of ultra-mobile devices (UMD's). Automatically or manually, a small-mode interface on a UMD screen, wherein one application window is visible, is switched to a large-mode interface.

19 Claims, 4 Drawing Sheets

MODE-SWITCHING IN ULTRA MOBILE DEVICES

FIELD OF THE INVENTION

The present invention relates to ultra-mobile devices (UMD's) and their displays, and to arrangements for managing the displays.

BACKGROUND OF THE INVENTION

The terms "laptop", "laptop computer", "notebook" and "notebook computer", as broadly employed herein, should be understood to be interchangeable with one another and to broadly relate to essentially any type of portable computer as commonly understood in connection with any or all of those four terms.

Ultra-mobile devices (UMD's) have proliferated in recent years and have taken on many forms. Generally they refer to any smaller, portable computing device that has a host of capabilities normally found in a desktop or laptop computer, such as (but by no means limited to): internet access, word processing, and image display and management. Indeed, UMD's often have at least as much computing power as a typical laptop.

Because of their smaller size, however, UMD's have tended to suffer from several user interface issues. In many cases, the user interface is a scaled-down version of a full-sized user interface (such as "WINDOWS EXPLORER") and the small screen involved does not at all lend itself easily to the consumption or creation of data, or to general navigation and use. Also, UMD's tend to require an excess of gross motor movements when being navigated, especially in proportion to laptops and desktops; further, the motor movements involved are necessarily more intricate and exacting, and can often present great discomfort.

Another problem has been encountered in that UMD's enjoy only a relatively short battery life when compared to laptops. Given that UMD's are for many consumers replacing laptops, this deficiency has been seen to warrant improvement.

In view of the foregoing, a need has been recognized in connection with overcoming the shortcomings and disadvantages presented by known arrangements as discussed above.

SUMMARY OF THE INVENTION

In accordance with a preferred embodiment of the present invention, an implementation is made for switching between a large-mode interface (e.g. Windows Explorer) and a small-mode interface in a UMD. The switch between the two interfaces can be brought about automatically or manually.

In an advantageous refinement of the present invention, the aforementioned problem of short battery life can be mitigated by reducing power consumption while a small-mode interface is employed.

In summary, one aspect of the invention provides a method comprising: providing a UMD computer system, the UMD computer system comprising a screen; effecting a small-mode interface on the UMD computer system screen, wherein one application window is visible on the screen; effecting a second interface on the UMD computer system screen; switching between the small-mode interface and the second interface.

Another aspect of the invention provides a UMD computer system comprising: a CPU; a system memory in communication with the CPU; a screen; an arrangement for effecting a small-mode interface on the UMD computer system screen, wherein one application window is visible on the screen; an arrangement for effecting a second interface on the UMD computer system screen; and an arrangement for switching between the small-mode interface and the second interface.

Furthermore, an additional aspect of the invention provides a program storage device readable by machine, tangibly embodying a program of instructions executable by the machine to perform a method comprising: providing a UMD computer system, the UMD computer system comprising a screen; effecting a small-mode interface on the UMD computer system screen, wherein one application window is visible on the screen; effecting a second interface on the UMD computer system screen; switching between the small-mode interface and the second interface.

DESCRIPTION OF THE PREFERRED EMBODIMENTS

For a better understanding of the present invention, together with other and further features and advantages thereof, reference is made to the following description, taken in conjunction with the accompanying drawings, and the scope of the invention will be pointed out in the appended claims.

It will be readily understood that the components of the present invention, as generally described and illustrated in the Figures herein, may be arranged and designed in a wide variety of different configurations. Thus, the following more detailed description of the embodiments of the apparatus, system, and method of the present invention, as represented in FIGS. 1 through 4, is not intended to limit the scope of the invention, as claimed, but is merely representative of selected embodiments of the invention.

Reference throughout this specification to "one embodiment" or "an embodiment" (or the like) means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

Furthermore, the described features, structures, or characteristics may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

The illustrated embodiments of the invention will be best understood by reference to the drawings, wherein like parts are designated by like numerals or other labels throughout.

The following description is intended only by way of example, and simply illustrates certain selected embodiments of devices, systems, and processes that are consistent with the invention as claimed herein.

Figure 1:
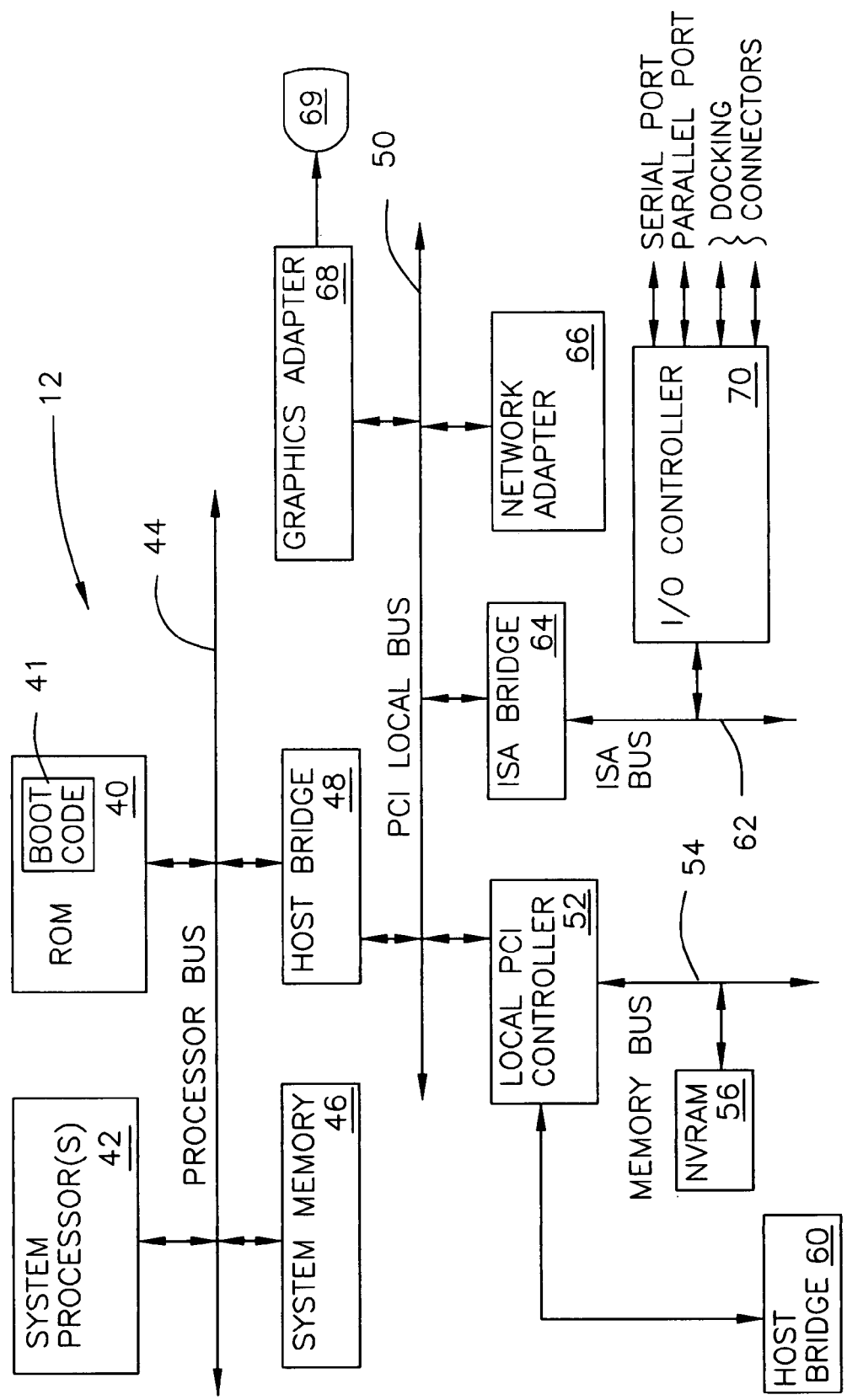
FIG. 1 schematically illustrates a UMD computer system.

Referring now to FIG. 1, there is depicted a block diagram of an illustrative embodiment of a computer system 12. The illustrative embodiment depicted in FIG. 1 may be a UMD system as broadly contemplated herein.

As shown in FIG. 1, computer system 12 includes at least one system processor 42, which is coupled to a Read-Only Memory (ROM) 40 and a system memory 46 by a processor bus 44. System processor 42 is a general-purpose processor that executes boot code 41 stored within ROM 40 at power-on and thereafter processes data under the control of operating system and application software stored in system memory 46. System processor 42 is coupled via processor bus 44 and host bridge 48 to Peripheral Component Interconnect (PCI) local bus 50.

PCI local bus 50 supports the attachment of a number of devices, including adapters and bridges. Among these devices is network adapter 66, which interfaces computer system 12 to LAN 10, and graphics adapter 68, which interfaces computer system 12 to display (or monitor) 69. Communication on PCI local bus 50 is governed by local PCI controller 52, which is in turn coupled to non-volatile random access memory (NVRAM) 56 via memory bus 54. Local PCI controller 52 can be coupled to additional buses and devices via a second host bridge 60.

Computer system 12 further includes Industry Standard Architecture (ISA) bus 62, which is coupled to PCI local bus 50 by ISA bridge 64. Coupled to ISA bus 62 is an input/output (I/O) controller 70, which controls communication between computer system 12 and attached peripheral devices such as a keyboard, mouse, and a disk drive. In addition, I/O controller 70 supports external communication by computer system 12 via serial and parallel ports. As known, docking connections enable the computer system 12 to be docked at a suitable docking station, which itself may provide expanded capabilities such as a large-screen monitor, a keyboard, a mouse and a disk drive.

Figure 2:
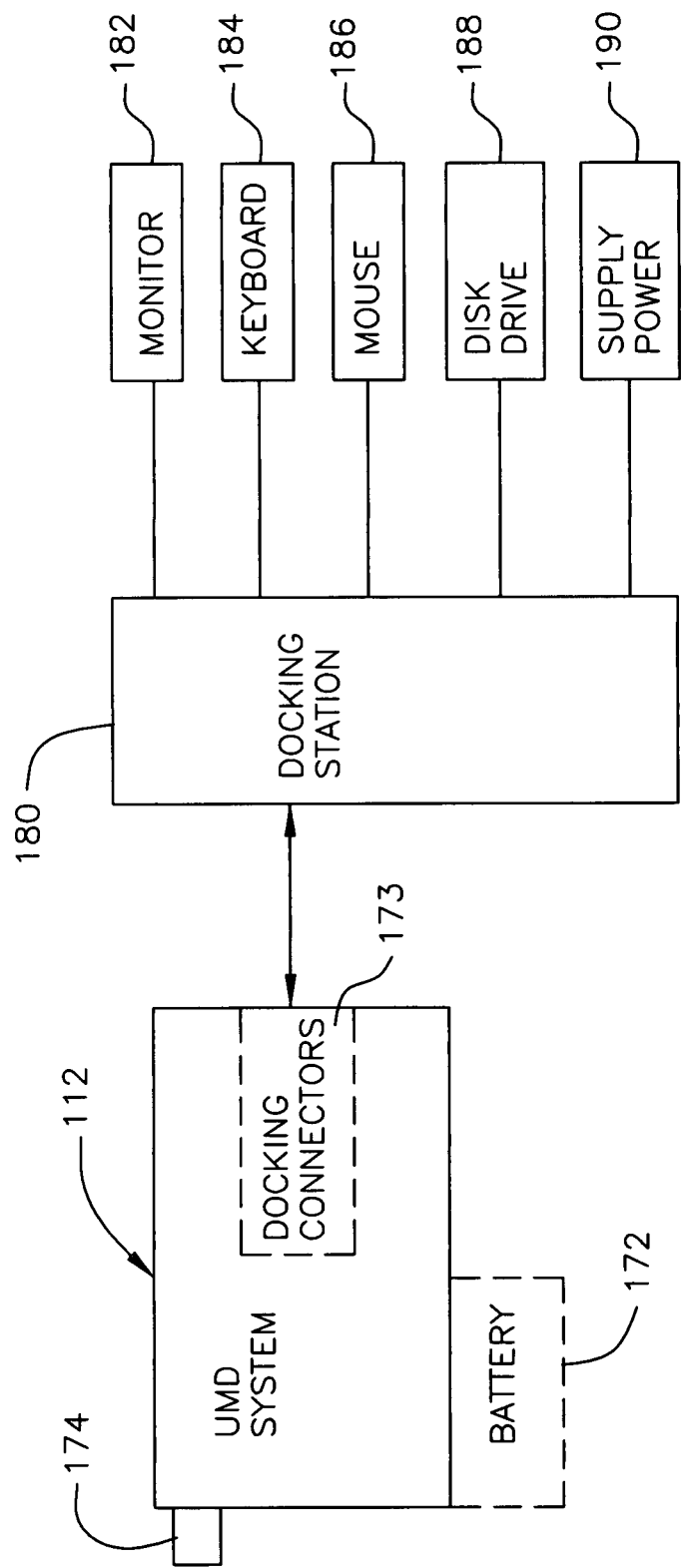
FIG. 2 schematically illustrates a UMD system and docking station.

Indeed, as shown schematically in FIG. 2, a UMD system 112 (which may include any or all of the aspects of system 12 shown in FIG. 1) in accordance with a preferred embodiment of the present invention may be configured to mate with a docking station 180 to take advantage of expanded capabilities.

As known, system 112 is powered by a rechargeable battery 172. An actuator 174, to be discussed in more detail herebelow, may be disposed at an external portion of the casing of UMD 112. Finally, UMD 112 preferably includes suitable docking connectors 172 which will be well known to those of ordinary skill in the art.

For its part, docking station 180 is configured for physically receiving UMD system 112 and for functionally connecting therewith in a manner well known to those of ordinary skill in the art. With UMD system 112 docked in station 180, a range of additional components may be availed such as: a large screen monitor 182 (which can supersede the smaller monitor of UMD system 112); a keyboard 184 (in the absence of any on UMD system 112 itself) and a mouse 186 (also not normally present on UMD system 112 itself). Of course, a large screen monitor 182 need not necessarily be included in a docking station wherein the (smaller) screen of UMD system 112 itself might actually be employed when system 112 is docked.

Other components or capabilities which can be associated with docking station 180, and which UMD system 112 may take advantage of when docked, include, but are by no means limited to: a disk drive 188 and a supplemental (e.g., AC) power source 190.

In accordance with a preferred embodiment of the present invention, an implementation is made for switching between a large-mode interface (e.g. Windows® Explorer, or as may be employed in a large screen monitor 182) and a small-mode interface (as may be inherent to UMD system 112). Whereas the former interface is normally geared towards the use of a keyboard, mouse, and monitor (such as in a "docked" mode), the latter is much more manageable in the context of no keyboard, and a user who could potentially be moving around while using the device (such as in a "portable" mode, or when UMD system 112 is not docked at station 180).

To elaborate, the large mode interface will preferably be embodied by a standard PC interface known to those of ordinary skill in the art. On the other hand, the small-mode interface could preferably be embodied by an interface similar to any one of several small-device interfaces, such as that found in any of the "NOKIA 770", "WINDOWS MOBILE" or "PALM OS" systems. The common thread, it is to be understood, in accordance with a preferred embodiment of the present invention, is that the small-mode interface preferably opens only one application window at a time. As such, other applications can be minimized (i.e., "backgrounded") or even terminated (i.e., "killed" or requested to stop completely) to manage memory consumption. (For its part, program termination need not necessarily take place very frequently; for instance, it could be reserved solely for those processes which only need to run occasionally or which could start themselves back up as needed.) Thus, whereas a large-mode interface is suitable for multitasking, the small-mode interface would be configured more particularly for single-tasking.

Figure 3:
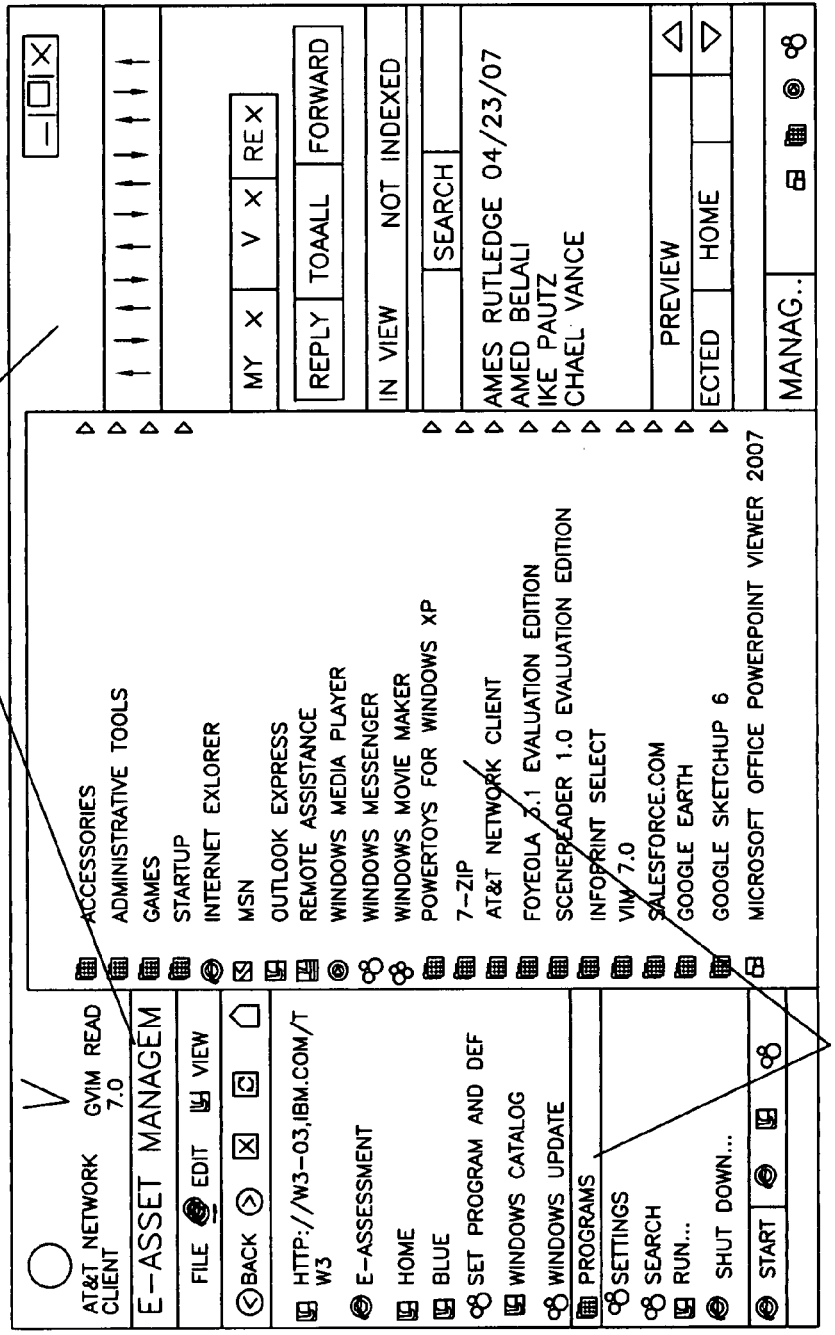
FIG. 3 illustrates an exemplary large-mode display.
Figure 4:
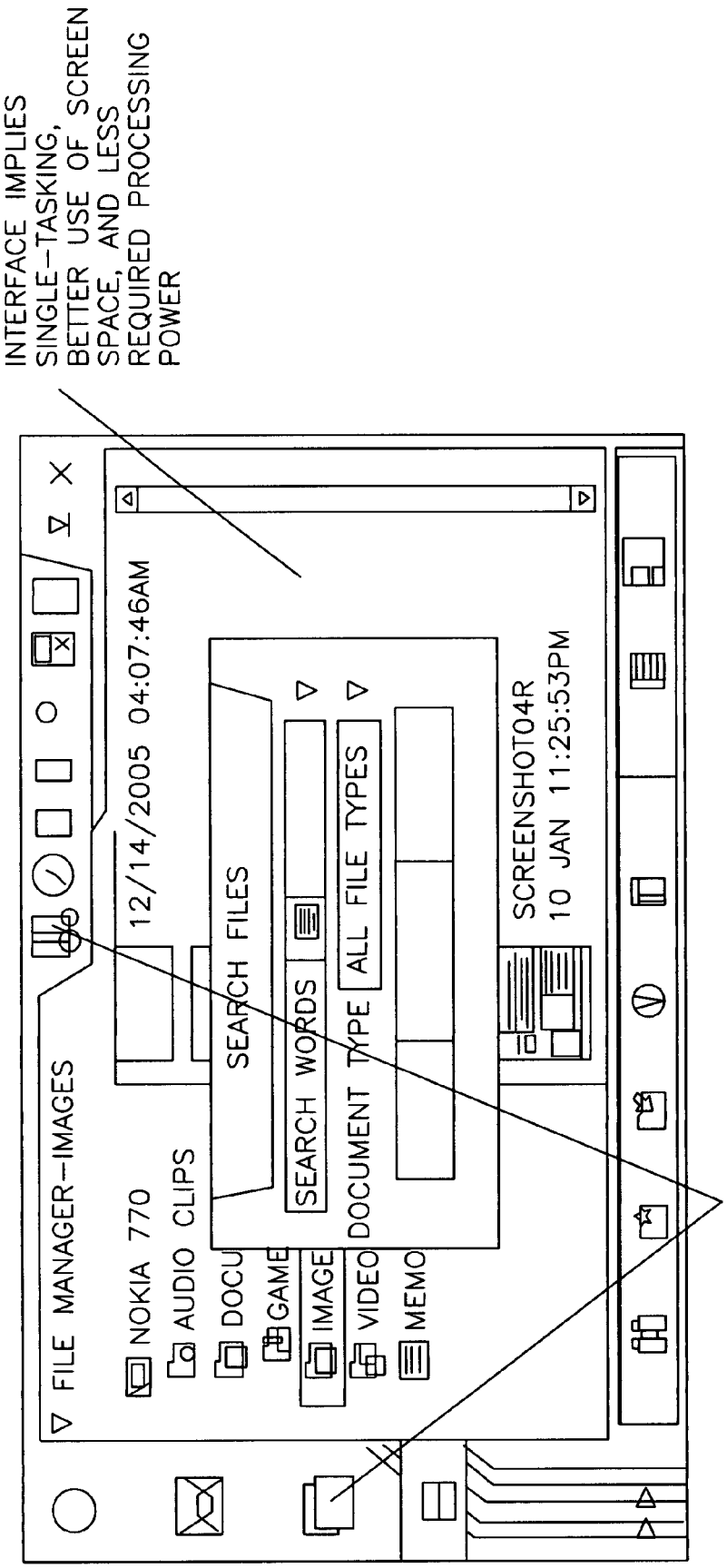
FIG. 4 illustrates an exemplary small-mode display.

FIGS. 3 and 4 illustrate fundamental differences between small-mode and large-mode interfaces. As shown in FIG. 3, a large-mode interface—here, a "WINDOWS XP" interface as often employed on conventional UMD's—can include many overlapping windows and menus when in use. Such an interface is often termed a "WIMP" (windows, icons, menus, pointing devices) interface and can be very unwieldy and awkward on the smaller screens of a UMD. As such, WIMP navigation tends to be better geared towards large screen monitors, and more processing power and screen space thus tends to be needed (or at least warranted) in connection with any desired multitasking.

In contrast, FIG. 4 shows a small-mode interface as presently used in the "NOKIA 770". Here, a single application interface is employed, with a more efficient and less crowded use of screen space, and consequently a need for less processing power. Navigation, for its part, is more appropriately suited for a small screen (such as a UMD screen) while easy access can be provided to common applications via icons on the sides of the screen (instead of employing multiple overlapping windows and menus simultaneously as in FIG. 3).

Returning to FIG. 2, there are broadly contemplated herein, in accordance with at least one presently preferred embodiment of the present invention, different mechanisms for affording a switch between a large-mode and a small-mode interface (wherein, preferably, a "small-mode" interface may be regarded as involving the use and appearance of solely one application at a time on the screen). In a first conceivable mechanism, the switch can be brought about automatically based on whether the UMD system 12 is docked or undocked or, at the very least, on whether a monitor is operatively associated with a larger screen monitor 182. In the latter sense, it is conceivable that a larger screen monitor 182 could in some manner be connected to a UMD system 112 directly without the intermediary of a docking station 180. Appropriate software or mechanical arrangements for detecting such connections are preferably operatively associated with a graphics adapter of a UMD system 112 to effect the switch into or out of either of the two interfaces. An automatic switch to large-mode interface can also be effected if a keyboard and/or mouse 184/186 are detected by the UMD, with a switch to small-mode interface made if one or more such components are not detected; again, such components could be detected in conjunction with a docking station 180 or in accordance with a direct interface of such components with a UMD system 112.

On the other hand, a manual arrangement for effecting a switch between a large-mode and small-mode interface is broadly contemplated. For instance, a manual actuator 174 such as a button or switch, or even a touch screen field or the like, could be selectively actuated by a user to effect a switch from one mode to another.

In an advantageous refinement of the present invention, the problem of short UMD battery life discussed heretofore can be mitigated by reducing power consumption while a small-mode interface is employed; as such, devices and processes can be managed at such times as to reduce power consumption.

More particularly, in order to manage battery power, a UMD system 112 in accordance with a preferred embodiment of the present invention may employ any or all of the techniques now to be described.

In a first conceivable technique, power consumption of UMD system 112 could be dropped or reduced by using standard ACPI (Advanced Configuration and Power Interface; www.acpi.info) measures, such as Performance States P0-Pn (i.e., power states "P-zero" through "P-n", or optional power states that allow device drivers to drop a device's power requirements. For instance, if a CD-ROM drive contains no CD, then clearly the drive has no immediate obligatory tasks to perform, whereupon the device driver could instruct it to "sleep".)

In another technique, aggressive process management may be brought about. For UMD use, for instance, it can be appreciated that processes such as the following could easily be re-niced (dropped severely in schedule priority) or terminated completely by way of reducing power consumption: non-critical system processes (e.g., network servers and time daemons); and processes that do not have focus (i.e., are not receiving keyboard and/or mouse data at that moment.) Because of the fact that only one application will be in focus at any given time, this is an easy decision to make.

Finally, in another conceivable technique, the UMD screen backlight could be made optional by incorporating a transflective display to take advantage of outside light while in mobile (non-docked) mode.

A very wide variety of other power-saving techniques in the context of a UMD small-mode interface are of course conceivable and are not intended to be limited by the specific examples discussed hereinabove.

If not otherwise stated herein, it is to be assumed that all patents, patent applications, patent publications and other publications (including web-based publications) mentioned and cited herein are hereby fully incorporated by reference herein as if set forth in their entirety herein.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. A method comprising:
   providing an ultra-mobile device (UMD) computer system, the UMD computer system comprising a screen;
   effecting a small-mode user interface on the UMD computer system screen, the small-mode user interface managing one application window on the UMD computer system screen;
   wherein the small-mode user interface occupies substantially all of the UMD computer system screen and is not a sub-portion thereof;
   effecting a large-mode user interface responsive to one or more large-mode user interface conditions being detected, the large-mode user interface managing a plurality of application windows; and
   switching between the small-mode user interface and the large-mode user interface.

2. The method according to claim 1, wherein said switching comprises automatically switching between the small-mode user interface and the large-mode user interface responsive to detection of a large-mode user interface condition.

3. The method according to claim 1, wherein said switching comprises:
   automatically switching from the small-mode user interface to the large-mode user interface responsive to detection of a connection with a docking station; and
   automatically switching from the large-mode user interface to the small-mode user interface responsive to detection of a lack of a connection with a docking station.

4. The method according to claim 1, wherein said switching comprises:
   automatically switching from the small-mode user interface to the large-mode user interface responsive to detection of a connection with a large-screen monitor; and
   automatically switching from the large-mode user interface to the small-mode user interface responsive to detection of a lack of a connection with a large-screen monitor.

5. The method according to claim 1, wherein said switching comprises:
   automatically switching from the small-mode user interface to the large-mode user interface responsive to detection of a connection with a keyboard; and
   automatically switching from the large-mode user interface to the small-mode user interface responsive to detection of a lack of a connection with a keyboard.

6. The method according to claim 1, wherein said switching comprises:
   automatically switching from the small-mode user interface to the large-mode user interface responsive to detection of a connection with a mouse; and
   automatically switching from the large-mode user interface to the small-mode user interface responsive to detection of a lack of a connection with a mouse.

7. The method according to claim 1, wherein said switching comprises manually switching between the small-mode user interface and the large-mode user interface.

8. The method according to claim 7, wherein said switching comprises manually switching from the small-mode user interface to the large-mode user interface via a manual actuator connected with the UMD computer system.

9. The method according to claim 1, wherein said effecting of a small-mode user interface comprises effecting a reduction in power consumption of the UMD computer system.

10. The method according to claim 9, wherein said effecting of a reduction in power consumption comprises re-nicing a UMD computer system process.

11. The method according to claim 9, wherein said effecting of a reduction in power consumption comprises terminating a UMD computer system process.

12. The method according to claim 9, wherein said effecting of a reduction in power consumption comprises suppressing a backlight associated with the screen.

13. The method of claim 1, wherein the small-mode interface is a single application interface for single tasking with navigation elements geared toward easy access to common applications.

14. An ultra-mobile device (UMD) computer system comprising:
   a CPU;
   a system memory in communication with said CPU;
   a screen;
   an arrangement for effecting a small-mode user interface on the UMD computer system screen, the small-mode user interface managing one application window on the UMD computer system screen;
   wherein the small-mode user interface occupies substantially all of the UMD computer system screen and is not a sub-portion thereof;
   an arrangement for effecting a large-mode user interface responsive to one or more large-mode user interface conditions being detected, the large-mode user interface managing a plurality of application windows; and
   an arrangement for switching between the small-mode user interface and the large-mode user interface.

15. The system according to claim 14, wherein said switching arrangement acts to automatically switch between the small-mode user interface and the large-mode user interface responsive to detection of a large-mode user interface condition.

16. The system according to claim 14, wherein said switching arrangement acts to:
   automatically switch from the small-mode user interface to the large-mode user interface responsive to detection of a connection with a docking; and
   automatically switch from the large-mode user interface to the small-mode user interface responsive to detection of a lack of a connection with a docking station.

17. The system according to claim 14, wherein said switching arrangement acts to manually switch between the small-mode user interface and the large-mode user interface.

18. The system according to claim 14, wherein said arrangement for effecting a small-mode user interface acts to effect a reduction in power consumption of said UMD computer system.

19. A program storage device readable by machine, tangibly embodying a program of instructions executable by the machine, the program of instructions comprising:
   instructions that provide an ultra-mobile device (UMD) computer system, the UMD computer system comprising a screen;
   instructions that effect a small-mode user interface on the UMD computer system screen, the small-mode user interface managing one application window on the UMD computer system screen;
   wherein the small-mode user interface occupies substantially all of the UMD computer system screen and is not a sub-portion thereof;
   instructions that effect a large-mode user interface when one or more large-mode user interface conditions are detected, the large-mode user interface managing a plurality of application windows; and
   instructions that switch between the small-mode user interface and the large-mode user interface.

* * * * *